(12) United States Patent     (10) Patent No.:   US 8,214,068 B2
Colombo et al.     (45) Date of Patent:   Jul. 3, 2012

(54) COLLABORATIVE AUTOMATION SYSTEM AND METHOD FOR THE CONTROL THEREOF

(75) Inventors: Armando Walter Colombo, Karlstein (DE); Axel Bepperling, Frankfurt (DE); Ronald Schoop, Hainburg (DE); Rui Milagaia, Lissabon (PT); Marco Mendes, Ponte de Lima (PT)

(73) Assignee: Schneider Electric Automation GmbH, Seligenstadt (DE)

( * ) Notice: Subject to any disclaimer, the term of this patent is extended or adjusted under 35 U.S.C. 154(b) by 189 days.

(21) Appl. No.: 12/451,280

(22) PCT Filed: Apr. 29, 2008

(86) PCT No.: PCT/EP2008/055247
§ 371 (c)(1),
(2), (4) Date: Jan. 27, 2010

(87) PCT Pub. No.: WO2008/135459
PCT Pub. Date: Nov. 13, 2008

(65) Prior Publication Data
US 2010/0138015 A1    Jun. 3, 2010

(30) Foreign Application Priority Data

May 4, 2007 (DE) .......................... 10 2007 021 412

(51) Int. Cl.
*G06F 19/00* (2011.01)
(52) U.S. Cl. ............................. 700/96; 705/300; 705/301
(58) Field of Classification Search .................... 700/96; 705/300, 301, 336
See application file for complete search history.

(56) References Cited

U.S. PATENT DOCUMENTS

| | | | |
|---|---|---|---|
| 6,928,396 B2 * | 8/2005 | Thackston ........................ 703/1 |
| 2007/0016439 A1 * | 1/2007 | Stiles et al. ........................ 705/1 |

OTHER PUBLICATIONS

Bepperling, et al., "A Framework for Development and Implementation of Web service-Based Intelligent Autonomous Mechatronics Components", Aug. 2006, IEEE, pp. 341-347.
Jammes, et al., "Service-Oriented Device Communications Using the Devices Profile for Web Services", Dec. 2005, pp. 1-8.
Colombo, et al., Collaborative (Agent-Based) Factory Automation, Nov. 2004, pp. 109-1-109-21.
Colombo, et al., "An Agent-Based Intelligent Control Platform for Industrial Holonic Manufacturing Systems", Feb. 2006, IEEE, vol. 53, No. 1, pp. 322-337.

\* cited by examiner

*Primary Examiner* — Sean Shechtman
(74) *Attorney, Agent, or Firm* — Dennison, Schultz & MacDonald

(57) ABSTRACT

The invention relates to a collaborative automation system (PS), comprising devices providing divided production and control services (D) such as transport and processing machines (M) with associated device agents (ST-AG, MA-AG), products with associated product agents (WP-AG), and a coordination unit (CO) providing a communication platform (SKP); the invention further relates to a method for the control of such a system. In order to obtain a dynamic detection and calling of processes in a loosely coupled production structure and infrastructure, the invention provides for devices (ST, MA, WP) providing the production and control services to be associated with a DPWS-based web service (ST-WS; MA-WS), wherein device functions are implemented into the DPWS-based web service as device service and agent functions. The communication platform (SKP) is designed as a uniform, DPWS-oriented SOA platform. The devices (ST, MA, WP) providing production and control services communicate via an integrated DPWS-based web service (ST-WS; MA-WS) and via a single communication platform (SKP), wherein device functions are implemented as device services (ST-WS; MA-WS) and agent functions describing device agents (ST-AG; MA-AG; WP-AG) as agent services in the DPWS-based web service. The communication platform is used as a uniform, DPWS-oriented SOA platform.

6 Claims, 7 Drawing Sheets

Move() = Bewege()

COLLABORATIVE AUTOMATION SYSTEM AND METHOD FOR THE CONTROL THEREOF

Figure 1:
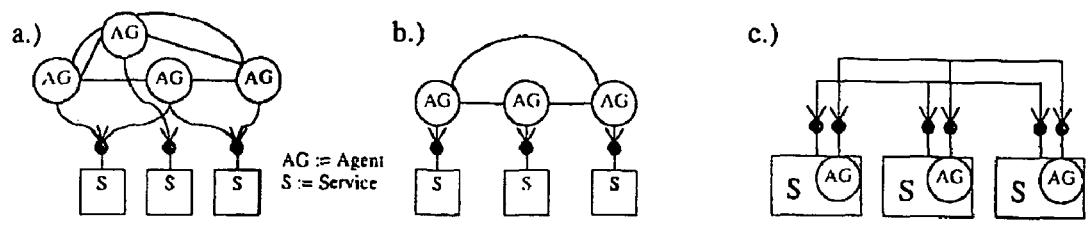

The invention concerns a collaborative automation system that encompasses devices that provide distributed production and control service, such as transport and processing machines with associated device-agents, products with associated product-agents as well as a coordination unit that provides a communication platform as well as a process for controlling a collaborative automation system.

In recent years Multi-Agent Systems (MAS) were used occasionally in industrial automation installations without however achieving uniform acceptance. Presently their application is limited to the planning of production processes. Examples for agent platforms and systems that were developed by research institutes or industrial projects:

The Actor-Based Assembly System (ABAS®) claims to not only achieve the goals of the slim, agile and flexible mass production but to even exceed them. It offers a highly precise collaborative automation platform that is free of the traditionally rigidly coupled assembly system structure. It offers a highly dynamic, reconfigurable assembly solution in a pilot installation that is located in Tampere, Finland.

The ADACOR (ADAptive holonic COntrol aRchitecture for distributed, decentralized production systems) is a control architecture, developed and implemented at the Polytechnic Institute of Braganca, Portugal. The system aims to provide flexible responses in regard to disruptions of the operation in order to enhance agility and flexibility of the enterprise when it is operating in environments that are characterized by the frequent occurrence of unexpected disruptions.

P2000+, FactoryBroker™. Parallel to the Initiative Intelligent Manufacturing System (EMS) Holonic Manufacturing System (HMS-Initiative) the first industrial agent-controlled production line was developed by Schneider Electric Automation and was put into operation successfully in a production line for automobiles.

This line is still in operation and proves the concept of reconfigurable systems in the control of production systems. FactoryBroker™ is an example of a system that utilizes the proprietary COM/DCOM (Component Object Model/Distributed Component Object Model)—technology for agent interactions.

J. L. M. Lastra: "Reference Mechatronic Architecture for Actor-Based Assembly Systems", Dissertation for the attainment of the PhD, Technische Universität, Tampere, Finland, 2004.

A. W. Colombo, R. Schoop; R. Neubert: "Collaborative (Agent-Based) Factory Automation", chapter 109 in: The Industrial Information Technology Handbook, Richard Zurawski (publisher), CRC Press LLC, Boca Raton, USA, Nov. 2004.

A. W. Colombo, R. Schoop; R. Neubert: "An Agent-based Intelligent Control Platform for Industrial Holonic Manufacturing Systems", IEEE Transaction on Industrial Electronics (IEEE-IES), Feb. 2006.

R. Harrison, A. W. Colombo, A. A. West, S. M. Lee: "Reconfigurable Modular Automation Systems for Automotive Power-Train Manufacture", International Journal of Flexible Manufacturing Systems, Springer-Verlag, London 2007.

The SOA (Service-Oriented-Architecture), which is based on web service technology, finds more and more use in the world of automation technology and is already being utilized as a communication and control platform. Therefore web technology is fundamentally available as a communication infrastructure for new production platforms in the realm of flexible automation. One of the reasons why agent-based systems failed at an earlier time is that they were implemented with communication technologies that blocked a reconfiguration of the production control system, whereby they counteracted the desired autonomy principle for intelligent systems.

The SIRENA project was a European research and development project with the aim to develop a service infrastructure for embedded real time network applications. The SIRENA-project aims to develop a service-oriented framework for specification and development of distributed applications in different underlying computer environments, including industrial automation, vehicle electronics, domestic automation and telecommunication systems.

I. M. Delamer: Event-Based Middleware for Reconfigurable Manufacturing Systems: 10 "Reference Mechatronic Architecture for Actor-Based Assembly Systems", Dissertation for the attainment of the PhD, Technische Universität, Tampere, Finland, 2006.

In DE 10 2007 004 654 "Kommunikationsschnittstelle zwischen DPWS-basierten Diensten" (Communication interface between DPWS-based services) the application of web service technologies and the DPWS standard are described for the purposes of achieving higher agility and flexibility in the production system. A general interface for every device and standardized interaction patterns are used for negotiation between service-providers and -users.

There is a strong conceptual synergy between the SOA and the agent-based approaches. Fundamental characteristics of the SOA are the provision of dynamic indicators and the calling of processes by loosely connected means. Instead of coupling services rigidly with one another, SOA simplifies the reorganization of distributed systems. This dynamic and the genuine ability to reconfigure structures are prerequisites in order to implement multi-agent systems.

Presently the de facto industrial standard for agent communications consists of a compilation of communication rules and interactions, as laid down by the Foundation for Intelligent Physical Agents (FIPA). Even though specifications for the exchange of FIPA messages under XML and HTTP exist, they have to be aligned with the DPWS (Device Profile for Web Services)-Stack, particularly WSDL message specifications and the use of WS-eventing.

DWPS (Device Profile for Web-Services) specifications, for instance, contain an overlap with the FIPA message specification, which should be reconciled, for example header-elements of the WS addressing specification. The application of DPWS and particularly WS-Discovery can furthermore serve the purpose of implementing a distributed version of the directory services, such as is proposed in the FIPA abstract architecture, whereby an ad-hoc detection of agents and services is provided. Earlier attempts to integrate FIPA and web service were implemented in large systems and require application servers and data banks are therefore too cumbersome in order to be used in embedded systems.

In considering the different levels of the production systems, such as the levels of the multiple agents and the low-level services, where an agent is either tightly connected with a service component or is even variably connected with several, the question remains to what extent the system of services is coordinated through the service level itself (autonomous), or alternatively to what extent the agent system influences the sequence of operations of the production system. For instance, considering the FactoryBroker-solution, the control is provided entirely by the agent system, meaning the agents initiate the device services and call these up. Every interaction regarding the coordination between devices takes place across the agent system.

The described method has the disadvantage that complex and simple controls occur on the same level and are interwoven with one another, whereby the approach is strongly tied to a single technology.

Based on these considerations the invention has as its object to further develop a collaborative automation system, of the kind referred to initially, in such a way that a dynamic determination and call-up of processes in a loosely connected production and control infrastructure is achieved.

The object is met according to the invention by, among other things, associating a DWPS-based web service with the devices providing production and control services, wherein, in the DPWS-based webs service, device functions are implemented as device service, and device agents, that describe agent functions, are implemented as agent service and wherein the communication platform is implemented as a uniform, DPWS-oriented SOA platform.

The invention is based on the idea to compensate for the logical and functional separation of the levels by means of the integration of the agent functionality in the already existing service platform. Preferably web services are utilized as a vehicle in order to integrate agents on the same platform in parallel to the component service.

The agent head, placed, based on functional considerations, at the top-most position of the device service, expands the service platform and the device functionalities with agent functionalities, such as negotiations concerning service call-ups, pro-active decision making etc. The functional interfaces of the device remain intact. To take this direction, the service container has to be expanded with additional interior layers. Internally the possibilities of using agents must be considered in the context of the implementation of device services, so that negotiation, blockage provision etc. have an actual effect as to under which conditions and requirements a service is available and can be called up.

According to a preferred embodiment the DPWS-service, the agents service and the device service together with the device control and, if applicable, the device mechanics form a collaborative automation-service-unit.

In order to emphasize the different roles of agents and services within units providing the production and control service, a few comparisons are made. The production automation & control agent (PACA) builds on a SOA-based production component, in combination these can be identified as a collaborative automation service unit (CASU). If one considers PACA from an infrastructural standpoint, it is in principle a service that has been enhanced with higher-order capabilities, such as pro-activity, negotiation, autonomous decision-making. The unit CASU, however, can be regarded, without consideration of the SIRENA part, as PACA which, from a functional view point, is known as an agent in Factory Broker.

Furthermore it is intended that within the communication unit a configuration (layout) of a flexible production system is implemented, particularly configuration and layout of the transport and production services as well as the state of production at runtime.

The modeling of the production systems and the coordination can be accomplished on the basis of appropriate modeling languages, such as for instance BPEL4WS, PN-derivatives, SFC-derivatives or flow diagrams.

According to a further preferred embodiment the coordination unit can be arranged in an external, central, integrated and/or distributed implementation.

Furthermore the coordination unit features a support interface for connecting with an agent system that supports the selection of services and the optimal routing of products.

The device agents can thereby be implemented locally on the collaborative automation service unit or as separate components as product agents.

The invention furthermore concerns processes for the control of a collaborative automation system that encompasses devices that provide distributed production and control service, such as transport and processing machines with associated device-agents, products with associated product-agents as well as a coordination unit that provides a communication platform. The object is met according to the invention by the devices providing production and control services communicate by means of an integrated DWPS-based web service by means of a single communication platform, wherein, in the DPWS-based webs service, device functions are implemented as device service, and device agents, that describe agent functions, are implemented as agent service and wherein the communication platform is operated as a uniform, DPWS-oriented SOA platform.

Further details, advantages, and characteristics of the invention can be gathered not only from the claims, from which the characteristics can be gathered—as such and/or in combination—but also from the following description of preferred embodiment examples that can be gleaned from the drawing.

It is presented:

FIG. 1a: a multi-agent system and/or service relations in cross-mapping.

FIG. 1b: a multi-agent system and/or service relations in 1:1 mapping.

FIG. 1c: a multi-agent system and/or service relations in integrated means subject to application of the same infrastructure.

Figure 2:
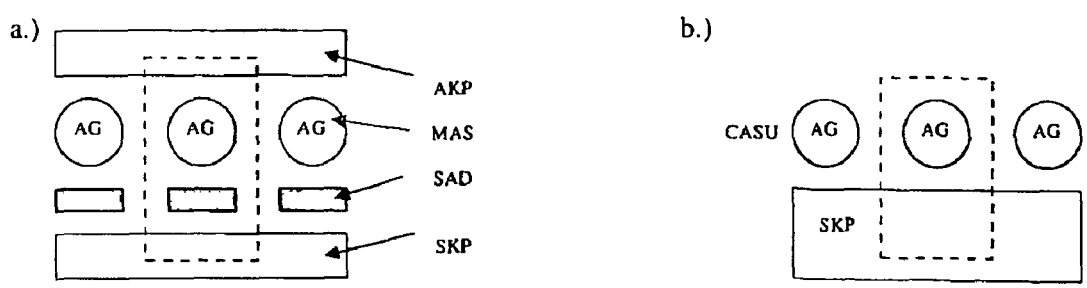

FIG. 2a: a collaborative automations service unit, wherein the physical agent is implemented as a separate agent layer with a separate communication platform.

FIG. 2b: a collaborative service unit, wherein the physical agent is implemented as an integrated service with a single communication platform.

Figure 3:
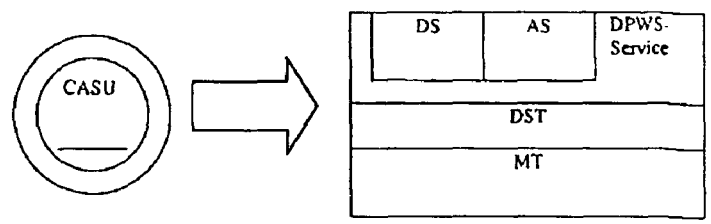

FIG. 3: the internal structure of a collaborative automation service unit.

Figure 4:
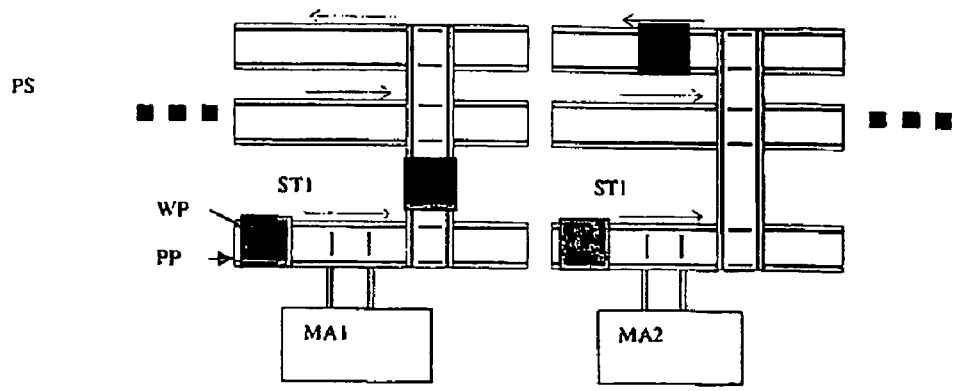

FIG. 4: a pattern of a complex set-up with a sliding table, work pieces, and machines.

Figure 5:
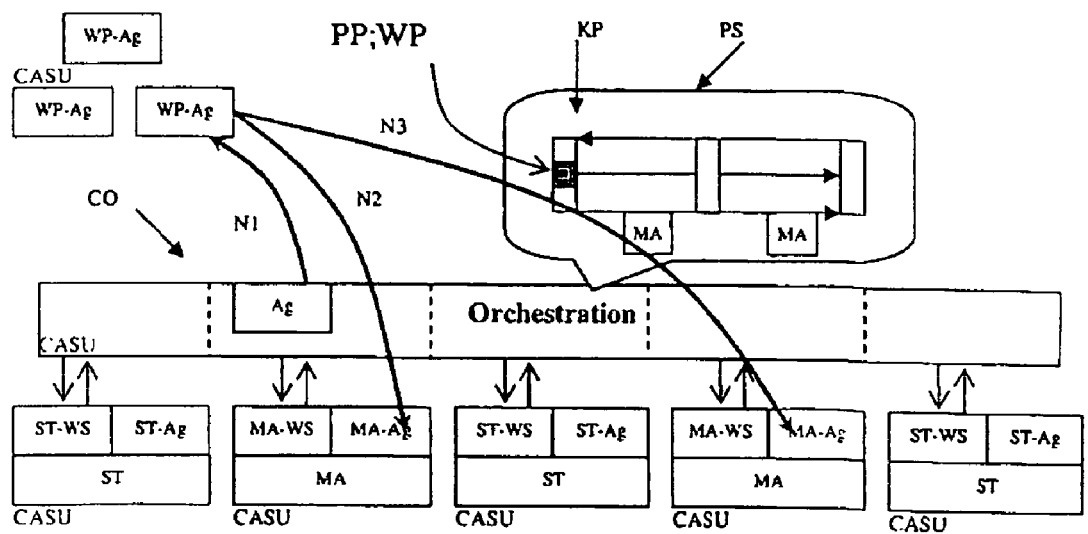

FIG. 5: a schematic representation of the conflict resolution and orchestration of CASU components.

Figure 6:
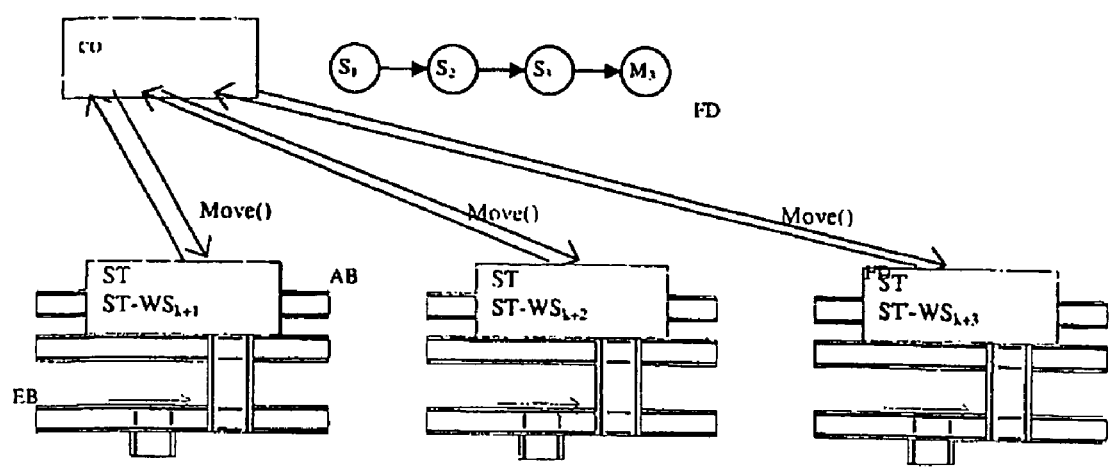

FIG. 6: a schematic representation of the exchange of operations between CASU components as well as a simplified sequential flow diagram.

Figure 7:
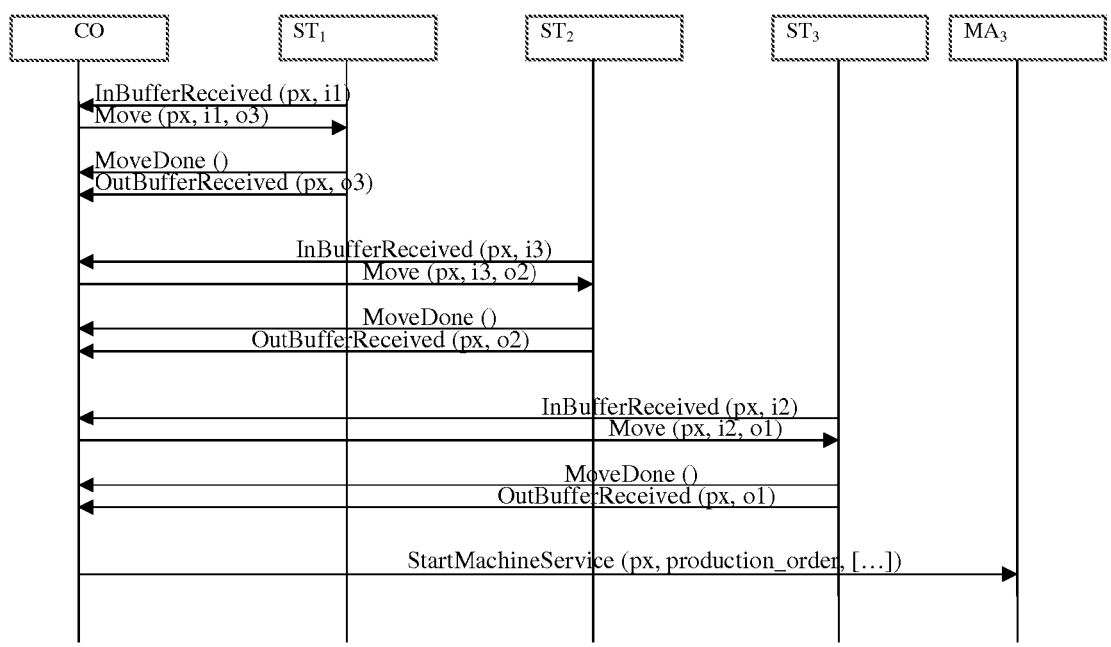

FIG. 7: a representation of interaction mechanisms between CASU components.

Figure 8:
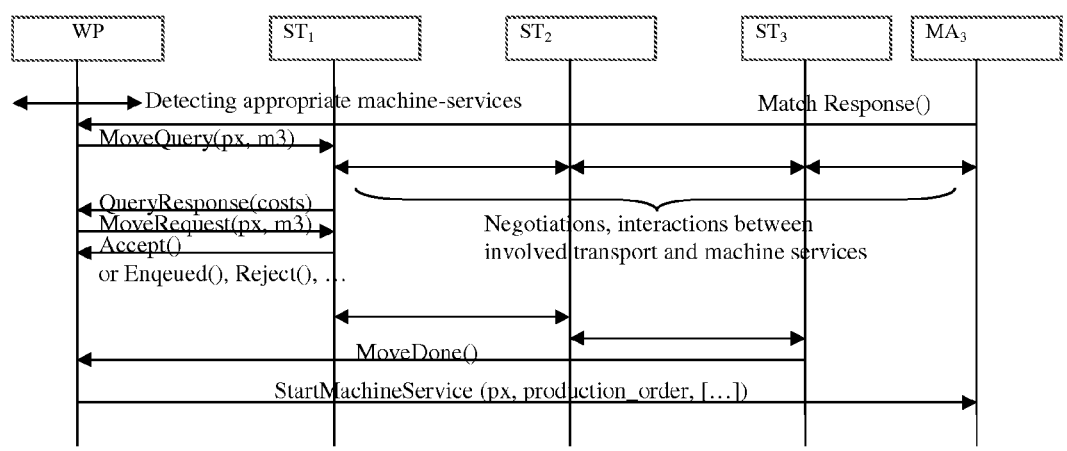

FIG. 8: a schematic representation of interaction mechanisms between CASU components subject to the use of DPWS characteristics for agent interaction.

Figure 9:
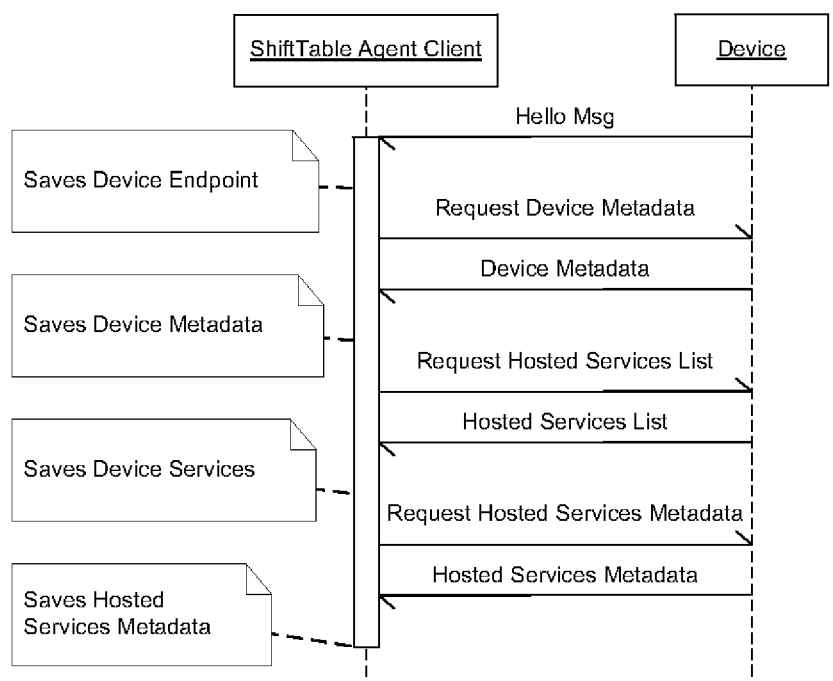

FIG. 9: a schematic representation of a communication subsequent to a Hallo-message or LOOK-up.

Figure 10:
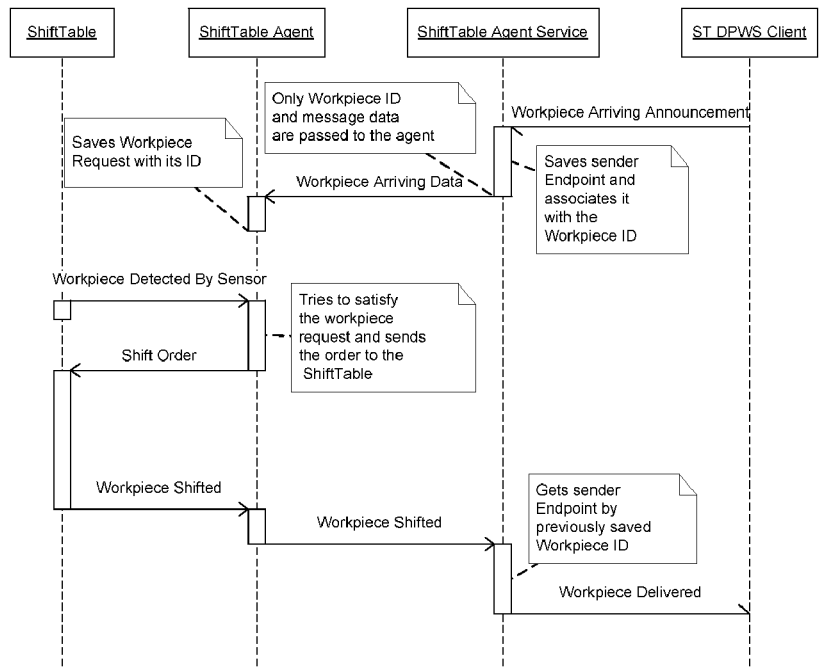

FIG. 10: a schematic representation of communication mechanisms between CASU components on the side of the CASU slide table.

Figure 11:
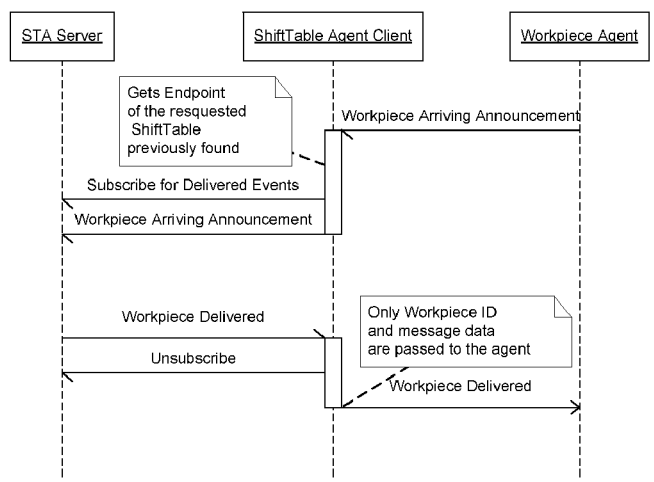

FIG. 11: a schematic representation of communication mechanisms between CASU components on the side of the work piece.

In the FIGS. 1a to 1c multi-agent systems/service relations are represented. The FIG. 1a thereby presents a cross-mapping, wherein several agents AG are in connection with one another as well as with one or several services S. FIG. 1b presents a 1:1 mapping, wherein the agents AG can communicate with one another and can call up services S. In the multi-agent system represented in FIG. 1c agents AG are integrated into the services S, using the same infrastructure.

FIG. 2a presents a structure, wherein the agents AG are disposed in a multi-agent system MAS which communicates by means of an agent communication platform AKP such as FIPA by means of DCOM. Independent thereof service-activatable devices SAD exist that communicate by means of a service communication platform SKP, such as for example by means of web technologies utilizing the SOAP and DPWS specification.

In contrast thereof the agent AG and the service-activatable device SAG are presented in FIG. 2b as a collaborative automation service unit CASU which communicates by means of a single communication platform SKP.

FIG. 3 presents the internal structures of a physical CASU component. These encompass the mechatronics MT, the device control DST as well as the DPWS services with integrated agent service AS as well as device service DS.

FIG. 4 displays a test implementation of a flexible production system PS, consisting of production machines MA1, MA2, a modular transport system with slide tables ST1, ST2, and product pallets PP, which can be shunted on the transport system, for the transport of products or work pieces WP.

FIG. 5 presents a schematic representation of the CASU components in relation to the production system PS presented in FIG. 4.

In a central instance CO the orchestration of the CASU components takes place that are connected with the instance CO. In the instance CO the internal model of the production system PS is implemented.

The hardware/software units such as slide table, machine as well as pallet/work piece are each represented by CASU components that exhibit the structure displayed in FIG. 3. The CASU components, which device services ST-WS, MA-WS as well as the associated agent services ST-AG as well as MA-AG. Furthermore product agents WP-AG are also displayed as CASU components which, however, do not comprise a device service DS.

As presented in FIG. 5, the control and coordination of the instance CO, implemented centralized or distributed, is accomplished, for example, by means of the method of orchestration. The control instance CO "knows" the layout of the flexible production system PS, meaning configuration and layout of the transport and production services as well as the state of production at runtime. The modeling of the production systems PS and the coordination is accomplished on the basis of appropriate modeling languages, such as for instance BPEL4WS, PN-derivatives, SFC-derivatives flow diagrams. Physical constraints such as, for example, the time response and the competing resource accesses and reactions in response to abnormal or unpredictable performance are to (or must) be respected in the process model, which can generate quite complex execution models.

The instance CO or the orchestrator (implemented externally, centrally, integrated and/or distributed) coordinates the production system PS on the basis of a response model that reflects the layout and the current state of the installation. An agent system, encompassing work piece agents WP-AG, slide table agent ST-AG and machine agent MA-AG, that is to support the selection of services and the optimal routing of products WP, is logically implemented outside the orchestration and connected with the orchestration by means of a support interface SI. Conflicts that appear at run time at the level of orchestration are communicated to the agent system by means of the interface SI.

If, for example, a pallet PP with a work piece WP with unknown destination reaches a junction KP, a conflict arises: By means of which machine MA should the next task be implemented? In this case the product WP on the pallet PP is initially identified by a product agent WP-AG that loads the next tasks, represented by arrow N1 (indicate conflict situation and request its solution). Subsequently several machines MA offer the next task as a service. The offer for bids with offer and selection of the machine MA is implemented by product agent WP-AG and machine agent MA-AG, represented by arrows N2, N3 (negotiation through agents). The machine agents MA-AG and slide table agents ST-AG can be locally integrated on the CASU component or be implemented as separate components, for example for a product agent WP-AG.

Slide table component as a service according to FIG. 6. The slide table ST is viewed as a service ST-WS which makes available elementary operations that permit actions such as, for example, "move pallet PP from a certain entry conveyor SP to a certain exit conveyor", release or output of events for the announcement of momentary states such as "a pallet PP at a certain entry conveyor EB is ready". The area of operations is limited to the local components. The service operations and events are atomically sufficient in order to permit a combination of several slide tables ST into a system, which can be coordinated and controlled by means of the coordinator CO, based on the existing set of operations. Additional interfaces are not available.

In this state the control and coordination is provided by the centralized instance CO, for example by means of the method of orchestration according to FIG. 5. The centralized instance "knows", as it were, the topology of the transport system, "knows" the distribution of the pallets PP and products WP. The coordination is accomplished through a type of global process description, for instance BPEL4WS, PN-derivatives, SFC-derivatives, flow diagrams or any appropriate better representation. Physical constraints such as, for example, the time response and the competing resource accesses and reactions in response to abnormal or unpredictable performance are to (or must) be respected in the process model, which can generate quite complex execution models.

A set of detailed operations of the slide table service can, for instance, be as follows:

Operation Move (pallet$_{id}$, in$_{num}$, out$_{num}$): This operation requests the transport of a pallet PP from an entry conveyor EB to an exit conveyor AB. Several asynchronous response types are possible: Registered, Rejected, Started, Done, Cancel, etc. To request a subordinate operation in regard to a shunting operation of a pallet PP, when it arrives at a certain entry location, to an exit of the table ST. The operation Move( )could be an assembled operation (sequentially) from: Move(p$_{id}$, in$_{num}$, out$_{num}$): =FetchIn(p$_{id}$, in$_{num}$)+MoveOut(p$_{id}$, out$_{num}$).

eventInBufferReceived (pallet$_{id}$, in$_{num}$) This event is transmitted when the slide table ST recognizes a pallet PP at one of its entry conveyor belts. This event can start a Move( )operation.

event outBufferReceived (pallet$_{id}$, out$_{id}$) The event after a Move( )was executed and the pallet was released to the conveyor belt of exit port. The receiver of the event can issue the next Move( ) operations.

eventOutBufferCriticalState (out$_{id}$) A slide table ST is capable of monitoring the status of its local conveyor belt through appropriately placed sensors. An exit conveyor belt can feature sensors that detect whether at least n-pallets can be shunted to this particular belt. When a critical buffer state is reached, an event is transmitted.

event InBufferTimeout (pallet$_{id}$, in$_{num}$) After a pallet PP has arrived at an entrance, a an event is transmitted, as described previously. A Move( )operation will convey the pallet PP on to an exit or will issue, after a predetermined timeout, an event that indicated the problem. This situation can arise if no Move( )operation is pending or if unexpected pallets arrive. In order to avoid obstructions, slide tables ST can also autonomously deliver such pieces to a predetermined exit belt.

An example of a communication between the coordinator CO and the slide tables ST1-ST3 is presented in FIG. 7. The coordinator CO manages the process sequence for the transport of pallet PX from the slide table ST1 to the slide table ST3 and utilizes the machine M3 that is associated with slide table ST3. The pallet follows the path: side table ST1 (in1 --; out3) ▶side table ST2 -▶ (in3 ->out2) - ▶side table ST3 (in2 --> out1) and is ready to be processed by machine M3 A simplified sequential flow diagram FD, that presents the service calls for transport of pallet PP from slide table ST1 and slide table ST3 and the start of the operation of machine M3, is presented in FIG. 6.

Slide Table Service Expanded to CASU (=service+PACA)

The expansion of the slide table component with agent functionality is treated here. In the previous paragraphs it was described how the coordinator CO can be utilized in order that the process of the transport of a pallet PP from one point to another point can be managed.

A critical concept of SOA is the loose connection of services and indeed slide tables ST, palettes PP, and machines M are viewed as naturally loosely connected services WS and they are utilized simultaneously by different clients and callers. Beyond that the system may also have to negotiate with redundant resources (for example machines that provide the same set of operations). Based on the figure of the diagram of the process sequence it is difficult to find a certain depiction of service requests for physical resources at the time of the design. The process is managed in abstract, staggered, independent steps and contains only the necessary types of services. The resource must be determined at runtime.

The process of locating a service is not processed immediately, as it is known from request-response pattern, wherein an operation is directly addressed. The service provider is viewed as a collectively used resource, therefore it processes service requests and the service allocation and processes the operation.

In reference to the figure of the diagram of the process sequence diagram an additional aspect of the formation of services of higher order shall be represented based on FIG. 8. Beforehand the process diagram describes how a pallet PP is transported from one place to another by means of arranging the services WS of the slide tables in the corresponding sequence. Now the slide table services ST-WS are assembled based on their inherent abilities of collaboration, so that the service request (work piece) utilizes the assembled service. Instead of move(1, 2) move(2,3) the request is labeled move (1,3) and the two move-services have to cooperate in order to satisfy the service of a higher order.

Activation

With DPWS-recognition it is unnecessary to start one (CASU-) device from another. If the slide table ST starts first, it is discovered by the (CASU-) work piece, when it starts; if the (CASU-) work piece starts first, the (CASU-) slide table announces itself when it starts. Their names should be recorded in the name section of the identification.

If a (CASU-) device is recognized, its meta data, services and service-meta data are requested so that this (CASU-) device can be accessed.

Whenever a new (CASU-) device appears on the network, it will transmit a Hello-message to all (multicast) and all other (CASU-) devices will request these new device data, services and service-meta data, as represented in FIG. 9.

A simple case is presented in FIGS. 10 and 11, wherein FIG. 10 presents the CASU slide table side and FIG. 11 presents the work piece side. The (CASU-) work WP1 arrives on the lower conveyor and wants to be transported to the upper conveyor. The work piece agent WP-AG registers itself at the (CASU-) slide table ST1 that was detected before and requests to be shunted from the lower conveyor to the upper. The message is forwarded to the DPWS communication level, which features a table that translates the provided slide table ST1 into the actual registered endpoint, if the slide table was detected. Provided with this end point, the message is now ready to be sent to the slide table agent ST-AG. The message is sent and the slide table agent DPWS level receives the message and translates the transmitter end point into a name WP1 that can be recognized by other (CASU-) agents and which the (CASU-) slide table agent ST-AG has been made aware of prior. The (CASU-) agent finally receives the work piece announcement from the work piece WP1.

Once the work piece WP reaches the entrance of the (CASU-) slide table ST, this is communicated by the hardware to the (CASU-) agent, which then gives the command whereto the work piece is to be shunted. The hardware shunts the work piece WP and informs the (CASU-) agent of the end of the process. Thereupon the (CASU-) agent prompts the DPWS communication level to send an event concerning the completion of the posed problem to the work piece WP1. The DRWS receives the stored end point from the assigned ID and sends a "work piece delivered" event to the DPWS level of the work piece agent.

After translation of the endpoint for a CASU ID that can be recognized by an agent, the DPWS level forwards this message to the (CASU-) agent which thereupon decides on the next action.

Process Details

The DPWS level has to be configured in regard to the registration guidelines. In order to receive events the client has to register for these events. One can always register for a type of events of every slide table, wherein the registration can be renewed if it expires or during the course of a request or a registration, when a notification arrives. The internal processes of the DPWS level have to be defined in order to optimize the network or the development time.

The Server

The service provider DPWS interface is simple and requires, for the correct execution, only the configuration of the server and the connection to the (CASU-) agents.

The Client

The client DPWS interface authorizes the agents to request services and to receive events. The interface registers itself for events, manages announcements so that these do not execute or that the agent does not receive unnecessary messages, by means of canceling the announcement, and manages the arrival and departure of devices in the network and informs the agent thereof.

Architecture

A device features a plurality of blocks. It consists of an agent, a server, one or several clients and potentially hardware. Every device features its services that are managed by the server and are dependent on the implementation of one or several clients. It can only feature one client that is capable of communicating with every device type, or several clients, usually corresponding to the number of device types, with whom the agent wants to communicate. If a device is started, the server sends a Hello message to all devices of the network and every client initiates a preview in order to detect other devices.

The invention claimed is:

1. A collaborative automation system (PS) encompassing devices that provide distributed production and control service, in form of transport and processing machines with associated device-agents as well as products with associated product-agents, wherein the devices that provide production and control service are associated with a Device Profile for Web-Services-Protocol-based web service;
   wherein device functions are implemented as device service, and device agents, that describe agent functions, are implemented as agents service in the Device Profile for Web-Services-Protocol-based web service;
   wherein the automation system features a coordination unit that provides a communication platform;
   wherein the communication platform is operated as a uniform, Device Profile for Web-Services-oriented platform with service-oriented architecture; wherein within the coordination unit a layout of the collaborative automation system as well as the state of the production at run time is implemented; and wherein the coordination unit features a support interface for connecting with an agent system that supports the selection of services and the optimal routing of products.

2. The collaborative automation system according to claim 1, wherein Device Profile for Web-Services-Protocol-service, agents service and device service together with the device control and, if applicable, device mechanics form a collaborative automation-service-unit.

3. The collaborative automation system according to claim 1, wherein the coordination unit is arranged in an external, central, integrated and/or distributed implementation.

4. The collaborative automation system according to claim 2, wherein the device agents are implemented locally on the collaborative automation service unit or as separate components as a product agent.

5. A process for the control of a collaborative automation system encompassing devices that provide distributed production and control service, in form of transport and processing machines with associated device-agents as well as products with associated product agents, wherein the devices that provide production and control service are associated with a Device Profile for Web-Services-Protocol-based web service;
   wherein device functions are implemented as device service, and device agents, that describe agent functions, are implemented as agents service in the Device Profile for Web-Services-Protocol-based web service;
   wherein the devices that provide production and control service communicate by means of a single communication platform provided by a coordination unit;
   wherein the communication platform is operated as a uniform, Device Profile for Web-Services-oriented platform with service-oriented architecture;
   wherein within the coordination unit a layout of the collaborative automation system as well as the state of the production at run time is implemented; and
   wherein the coordination unit features a support interface for connecting with an agent system that supports the selection of services and the optimal routing of products.

6. The process according to claim 5, wherein modeling of the production systems and coordination can be accomplished on the basis of appropriate modeling languages.

* * * * *